US010419537B1

United States Patent
da Silveira Junior et al.

(10) Patent No.: US 10,419,537 B1
(45) Date of Patent: Sep. 17, 2019

(54) ARCHITECTURE FOR A CONVERGED COMPUTE AND FILE SYSTEM WITHIN NETWORK-ATTACHED STORAGE CLUSTERS

(71) Applicant: EMC Corporation, Hopkinton, MA (US)

(72) Inventors: Jaumir Valença da Silveira Junior, Rio de Janeiro (BR); Rômulo Teixeira de Abreu Pinho, Niterói (BR); Angelo Ernani Maia Ciarlini, Rio de Janeiro (BR); Karin Koogan Breitman, Rio de Janeiro (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 246 days.

(21) Appl. No.: 15/080,554

(22) Filed: Mar. 24, 2016

(51) Int. Cl.
  *G06F 17/30* (2006.01)
  *H04L 29/08* (2006.01)
  *G06F 16/182* (2019.01)

(52) U.S. Cl.
  CPC ........ *H04L 67/1097* (2013.01); *G06F 16/183* (2019.01)

(58) Field of Classification Search
  CPC .... G06F 17/30; G06F 17/30203; G06F 17/00; H04L 67/1097; H06F 16/183
  USPC .................................................. 707/600–899
  See application file for complete search history.

(56) References Cited

U.S. PATENT DOCUMENTS

| | | | |
|---|---|---|---|
| 9,405,904 B1 * | 8/2016 | Fang | ....................... H04L 63/00 |
| 9,491,241 B1 | 11/2016 | Wan et al. | |
| 9,491,421 B2 | 11/2016 | Morimoto | |
| 9,495,207 B1 | 11/2016 | Pjesivac-Grbovic et al. | |
| 9,542,391 B1 * | 1/2017 | Eisner | ............... G06F 17/30011 |
| 2002/0186827 A1 | 12/2002 | Griffiths | |
| 2006/0259742 A1 | 11/2006 | Norden et al. | |
| 2007/0073783 A1 | 3/2007 | Honami et al. | |
| 2008/0235696 A1 | 9/2008 | Yamamoto et al. | |
| 2009/0216934 A1 | 8/2009 | King et al. | |
| 2012/0158672 A1 | 6/2012 | Oltean et al. | |
| 2013/0227573 A1 | 8/2013 | Morsi et al. | |

(Continued)

OTHER PUBLICATIONS

"Azure Data Factory", [https://azure.microsoft.com/en-us/services/data-factory/]. Retrieved on Aug. 17, 2016, 5 pages.

(Continued)

*Primary Examiner* — Isaac M Woo

(74) *Attorney, Agent, or Firm* — Amin, Turocy & Watson, LLP

(57) ABSTRACT

Scale-out network attached storage (NAS) file systems can employ an Ingest, Transform, Store (ITS) framework for data processing. In one aspect, the ITS-NAS file systems comprise NAS nodes and high performance computing (HPC) nodes that operate under a common operating system and that are coupled to each other via a common high-bandwidth, low-latency private network infrastructure. The NAS nodes can present data to the HPC nodes as well as dispatch the execution of transform services to the HPC nodes. The ITS-NAS file systems enable massive parallelization of operations on files, for example, complex distributed operations on large files and/or simple parallel operations on large collections of small files, all within the same hardware and software architecture.

20 Claims, 10 Drawing Sheets

(56) References Cited

U.S. PATENT DOCUMENTS

| | | | |
|---|---|---|---|
| 2013/0268545 A1* | 10/2013 | Burchett | G06F 16/258 707/754 |
| 2014/0267439 A1* | 9/2014 | Jenkins | H02M 3/157 345/668 |
| 2015/0372807 A1 | 12/2015 | Khoyi et al. | |
| 2016/0259798 A1 | 9/2016 | Humby et al. | |
| 2016/0344834 A1 | 11/2016 | Das | |

OTHER PUBLICATIONS

"The Kepler Project", [https://kepler-project.org/]. Retrieved on Aug. 17, 2016, 1 page.

"VisTrails", [http://www.vistrails.org/]. Retrieved on Apr. 21, 2017, 4 pages.

"File System Auditing with EMC Isilon and EMC Common Event Enabler", [https://www.emc.com/collateral/white-papers/h12428-wp-best-practice-guide-isilon-file-system-auditing.pdf]. Jan. 2016. Retrieved on Aug. 17, 2016, 19 pages.

"EMC Isilon Smartpools", 2014. [http://www.emc.com/collateral/hardware/data-sheet/h10566-ds-isilon-smartpools.pdf]. Retrieved on Aug. 17, 2016, 3 pages.

De Bruijne, Marleen. "Machine learning approaches in medical image analysis: From detection to diagnosis" Medical Image Analysis 33 (2016) 94-97. 4 pages.

"Flow cytometry", [https://en.wikipedia.org/wiki/Flow_cytometry]. Retrieved on Aug. 17, 2016, 4 pages.

"Storage Networking & Information Management Primer," 2015. Copyright SNIA. [http://www.snia.org/education/storage_networking_primer]. Retrieved on Jun. 29, 2016, 2 pages.

Dave, Anjan. "Understanding Enterprise NAS". 2012. [http://www.snia.org/sites/default/education/tutorials/2012/spring/file/AnjanDave_Understanding_Enterprise_NAS.pdf]. Retrieved on Jun. 29, 2016, 36 pages.

"VCE VSCALE™ Architecture: Flexibility for Whatever the Future Brings," VCE, 2015. [http://www.vce.com/asset/documents/vscale-architecture-value-whitepaper.pdf]. Retrieved on Jun. 29, 2016, 4 pages.

"VCE™ Technology Extension for EMC® Isilon® Storage," VCE, 2015. [http://www.vce.com/asset/documents/tech-extension-isilon-product-overview.pdf]. Retrieved on Jun. 29, 2016, 1 page.

"About InfiniBand," InfiniBand Trade Association, 2015. [http://www.infinibandta.org/content/pages.php?pg=about_us_infiniband]. Retrieved on Jun. 29, 2016, 2 pages.

"EMC Isilon OneFS: A Technical Overview," EMC, Jan. 2016. [https://www.emc.com/collateral/hardware/white-papers/h10719-isilon-onefs-technical-overview-wp.pdf]. Retrieved on Jun. 29, 2016, 42 pages.

Office Action dated Apr. 5, 2018 for U.S. Appl. No. 15/080,543, 26 pages.

Office Action dated Oct. 11, 2018 for U.S. Appl. No. 15/285,442, 52 pages.

Office Action dated Oct. 31, 2018 for U.S. Appl. No. 15/080,543, 23 pages.

Notice of Allowance dated Feb. 6, 2019 for U.S. Appl. No. 15/080,543, 44 pages.

Office Action dated Apr. 5, 2019 for U.S. Appl. No. 15/285,442, 43 pages.

\* cited by examiner

ARCHITECTURE FOR A CONVERGED COMPUTE AND FILE SYSTEM WITHIN NETWORK-ATTACHED STORAGE CLUSTERS

TECHNICAL FIELD

The subject disclosure relates generally to an architecture for a converged compute and file system within network-attached storage clusters.

BACKGROUND

The large increase in amount of data generated by digital systems yearns for more sophisticated approaches to data storing, processing, and analyzing. In this context, scale-out network-attached storage (NAS) file systems have proved popular as a technology for managing this "Big Data." However, conventional NAS file systems utilized for data storage are still passive, i.e., they do not drive decisions at the application level. On the other hand, applications that deal with pipelines of ingesting data from varied sources, processing these data according to business rules and then storing the processed results for further use are increasingly more common.

To deal with such data-intensive scenarios, some applications running in NAS environments utilize a "watch folder" mechanism, wherein the client application polls folders at regular time intervals for new files or changes in files, triggers transformation services on those files, and stores the results in output folders. To implement the "watch folder" mechanism, developers need to write code for polling content changes in folders that are exported via file transfer protocols, such as Network File System (NFS), Server Message Block (SMB), etc. These applications typically remain in a busy-wait state until they need to do computations upon the arrival or modification of a file. Under this configuration, each client application is a file system client unnecessarily consuming network resources (possibly other resources as well) while "doing nothing". As the number of clients increase, a pool of wasted resources is generated that can negatively affect the overall system performance.

Alternatively, some data intensive applications may run on top of file systems that provide mechanisms which allow application developers to intercept file system I/O requests and transparently carry out low-level operations on files, e.g., data compression, before forwarding the requests to the storage driver. However, such available mechanisms are limited to being executed within the context of the file systems themselves. Moreover, they do not have any knowledge about business rules at the application level, let alone the capacity to run high performance computing (HPC) tasks.

The above-described background relating to file systems is merely intended to provide a contextual overview of some current issues, and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods disclosed herein relate to a converged compute and file system within network-attached storage and compute clusters. In one example embodiment, a system is disclosed that comprises a processor and a memory that stores executable instructions that, when executed by the processor, facilitate performance of operations. Moreover, the operations comprise storing data within a file system of a network attached storage node device and directing at least a portion of the data to a high performance computing node device via a private back-end network link between both systems. Further, the operations comprise instructing the high performance computing node device to process at least portion of the data to generate results data. The high performance computing node device and the network attached storage node device operate under a common operating system.

Another example embodiment of the specification relates to a method that comprises storing, by a network attached storage node device comprising a processor, content received from a client device and communicating, by the network attached storage node device, with a high performance computing node device via a back-end network link. According to an aspect, the computing node device and the network attached storage node device operate under a common operating system.

Another example embodiment of the specification relates to a computer-readable storage medium comprising instructions that, in response to execution, cause a high performance computing node device comprising a processor to perform operations, comprising receiving content from a network attached storage node device via a back-end network link coupled to the high performance computing node device. The operations further comprise facilitating the transformation of the content to generate result data in response to receiving instruction data to initiate transformation of the content from the network attached storage node device. Moreover, the high performance computing node device and the network attached storage node device are managed by a common operating system.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
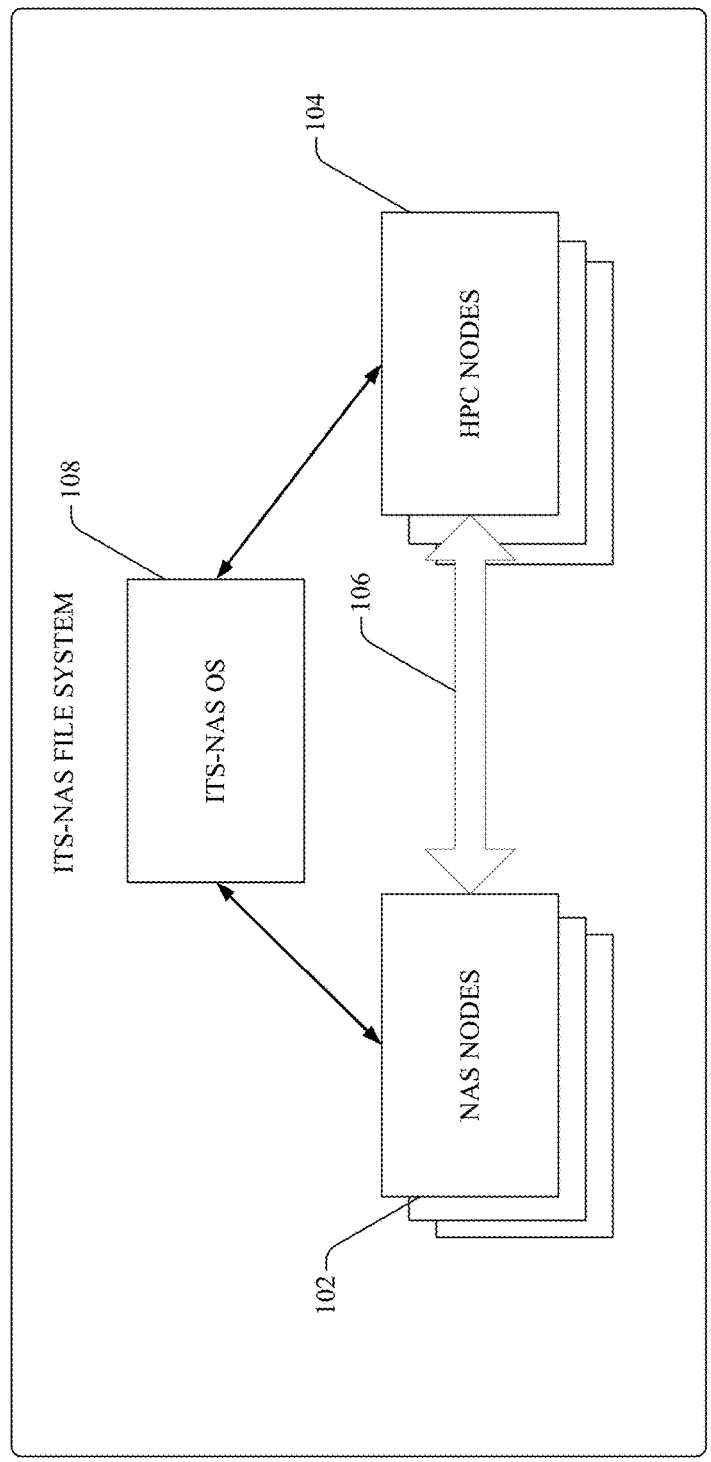
FIG. 1 illustrates an example Ingest, Transform, Store (ITS)-network attached storage (NAS) file system that facilitates integration of NAS nodes with high performance computing (HPC) nodes.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed file storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

Example systems and methods disclosed herein, in one or more embodiments, relate to scale-out network attached storage (NAS) file systems that employ an ingest, transform, and store (ITS) framework for data processing. In one aspect, the ITS-NAS file systems are comprised of NAS nodes that are tightly connected to high performance computing (HPC) compute nodes via a common high-bandwidth, low-latency network infrastructure. The terms "tightly coupled" and/or "tightly connected" as used herein refer to a system that can have at least the following characteristics: (i) run a single copy of the OS with a single workload queue; (ii) has a common address space; (iii) has a common bus or backplane to which all nodes are connected; (iv) has very low communication latency; and/or (v) the processing nodes can communicate through shared memory. The NAS nodes can provide data to the HPC nodes as well as dispatch the execution of transform services to the HPC nodes. This approach allows for massive parallelization of operations on files, for example, complex distributed operations can be performed on large files and/or simple parallel operations can be performed on large collections of small files, all within the same hardware and software architecture.

Referring initially to FIG. 1, there illustrated is an example ITS-NAS file system 100 that facilitates integration of NAS nodes 102 with HPC nodes 104, according to one or more aspects of the disclosed subject matter. The ITS-NAS file system 100 not only stores data but also performs HPC processing on the stored data. HPC utilizes parallel processing for running advanced application programs efficiently, reliably, and quickly. In one example, an HPC cluster of nodes (e.g., HPC nodes 104) can, but are not limited to, operates at least at one teraflop and/or perform at least $10^{12}$ floating-point operations per second. Typically, The HPC cluster employs specialized architectures and/or operations that provide high-performance and/or data-parallel processing for applications utilizing large volumes of data (e.g., Big Data) as compared to servers that handle low-level processing of data (e.g., data compression). In one aspect, the NAS nodes 102 of the ITS-NAS file system 100 can accept file Input/Output (I/O) requests from users (directed to files stored within the NAS nodes 102), redirect data processing tasks to the HPC nodes 104, and store the processed results within the NAS nodes 102 in a time-efficient fashion, using sets of rules established by users.

According to an embodiment, the NAS nodes 102 are tightly connected to the HPC nodes 104 via a low-latency (e.g., latency that is lower than a defined latency threshold, such as, but not limited to, 7 microseconds) and high-bandwidth (e.g., bandwidth that is greater than a defined bandwidth threshold, such as, but not limited to, 1 gigabyte/second) private network infrastructure 106 and can present data to and/or initiate services on the HPC nodes 104. The HPC nodes 104 can execute the services and/or apply transformations on the data presented by the NAS nodes 102 to generate output results, which are written back to the NAS nodes 102 (e.g., on previously designated folders). The output results are transmitted back to the NAS nodes 102 via the low-latency, high-bandwidth private network infrastructure 106. As an example, the NAS nodes 102 can store large volumes of data, such as Big Data, which is typically mined for information and/or patterns. Big Data is characterized by the large amount of data, the different types of data, and/or the rate at which the data must be processed. For example, Big Data can refer to, but is not limited to, petabytes and/or exabytes of data, that need specialized approaches to storage and/or analysis. According to an aspect, the Big Data stored within NAS nodes 102 can include raw data and metadata associated with the raw data. A set of clients, for example, Network File System (NFS) clients (not shown), can connect (e.g., simultaneously and/or substantially simultaneously) to the NAS nodes 102 via a network interface to access the stored data. As an example, the clients can read, write, add, and/or delete data based on access privileges assigned to the clients.

According to an aspect, the NAS nodes 102 are part of a scale-out NAS file system that can have, but are not limited to, at least the following characteristics: the scale-out NAS file system can comprise of several nodes (e.g., NAS nodes 102) linked via high-bandwidth, low-latency networks, wherein each node adds to the whole system storage and networking capabilities; Any node (e.g., NAS nodes 102) of the scale-out NAS file system can accept a user request for file I/O, and the nodes can cooperate via unified software to fulfill the user request and to store files internally; Nodes (e.g., NAS nodes 102) can be added to the scale-out NAS file system in a way that the overall performance scales up linearly with the number of added nodes; Nodes (e.g., NAS nodes 102) of the scale-out NAS file system can communicate with each other to store files during I/O write operations and to present requested files to users during I/O read operations; and/or Files can be split in chunks and several copies of the same chunk can be stored in different nodes (e.g., NAS nodes 102) of the scale-out NAS file system for resilience/performance requirements.

HPC largely benefits from distributed, scale-out infrastructures, in which computation power and storage capacity can grow on-demand, in a non-disruptive manner. Conventionally, the stitching between scale-out computing and scale-out storage has been performed by accessing NAS folders, using public networks utilizing protocols such as network file system (NFS), server message block (SMB), file transfer protocol (FTP), hadoop distributed file system (HDFS) and the like. However, HPC-ITS applications can run more efficiently in environments where computation and storage are connected seamlessly through high-speed communication channels, such as, the low-latency, high-bandwidth private network infrastructure 106. As an example, the low-latency, high-bandwidth private network infrastructure 106 can include most any scaleable private network such as, but not limited to, an InfiniBand (TB) network. The IB network can offer throughput of more than 2.5 gigabytes per second and/or support for at least 64,000 addressable devices. The low-latency, high-bandwidth private network infrastructure 106 brings scale-out computation power closer to scale-out data than that in conventional systems. In one aspect, scale-out operating systems (OSs), ITS-NAS OS 108, are employed to manage both computing (e.g., HPC nodes 104) and storage (e.g., NAS nodes 102) is advantageous to HPC-ITS applications and to HPC-NAS in general.

Moreover, the ITS-NAS file system 100 provides an HPC-capable, scale-out file system (e.g., NAS nodes 102) that is deployed as single unit, in which computation nodes (e.g., HPC nodes 104) and storage nodes (e.g., NAS nodes 102) are connected via a high-bandwidth, low-latency back-end network, and communicate with each other using their own protocol (e.g., IB protocol). This improves over traditional NAS architectures, wherein an independent HPC cluster can only communicate with a scale-out NAS system via well-known file transfer protocols such as NFS, SMB, FTP, HDFS etc. In addition, the ITS-NAS file system 100 has at least the following advantages: (i) easy-to-deploy and easy-to-use dedicated HPC capabilities are provided within the NAS cluster; (ii) high-performance and/or massively parallel computations can be carried out without affecting file system operations; (iii) easy grow-as-needed storage as well as computation; and/or (iv) suitable for the execution of complex distributed operations on large files as well as for simple parallel executions on large collections of small files.

In one example, the NAS nodes 102 can include a node and cluster storage system such as an EMC® Isilon® Cluster that operates under the OneFS® operating system. Further, the ITS-NAS OS 108 that manages and/or controls both the NAS nodes 102 and the HPC nodes 104 can include OneFS® OS. It is noted that the NAS nodes 102 can include volatile memory(s) or nonvolatile memory(s), or can include both volatile and nonvolatile memory(s). Examples of suitable types of volatile and non-volatile memory are described below with reference to FIG. 7. The memory (e.g., data stores, databases) of the subject systems and methods is intended to comprise, without being limited to, these and any other suitable types of memory.

Figure 2:
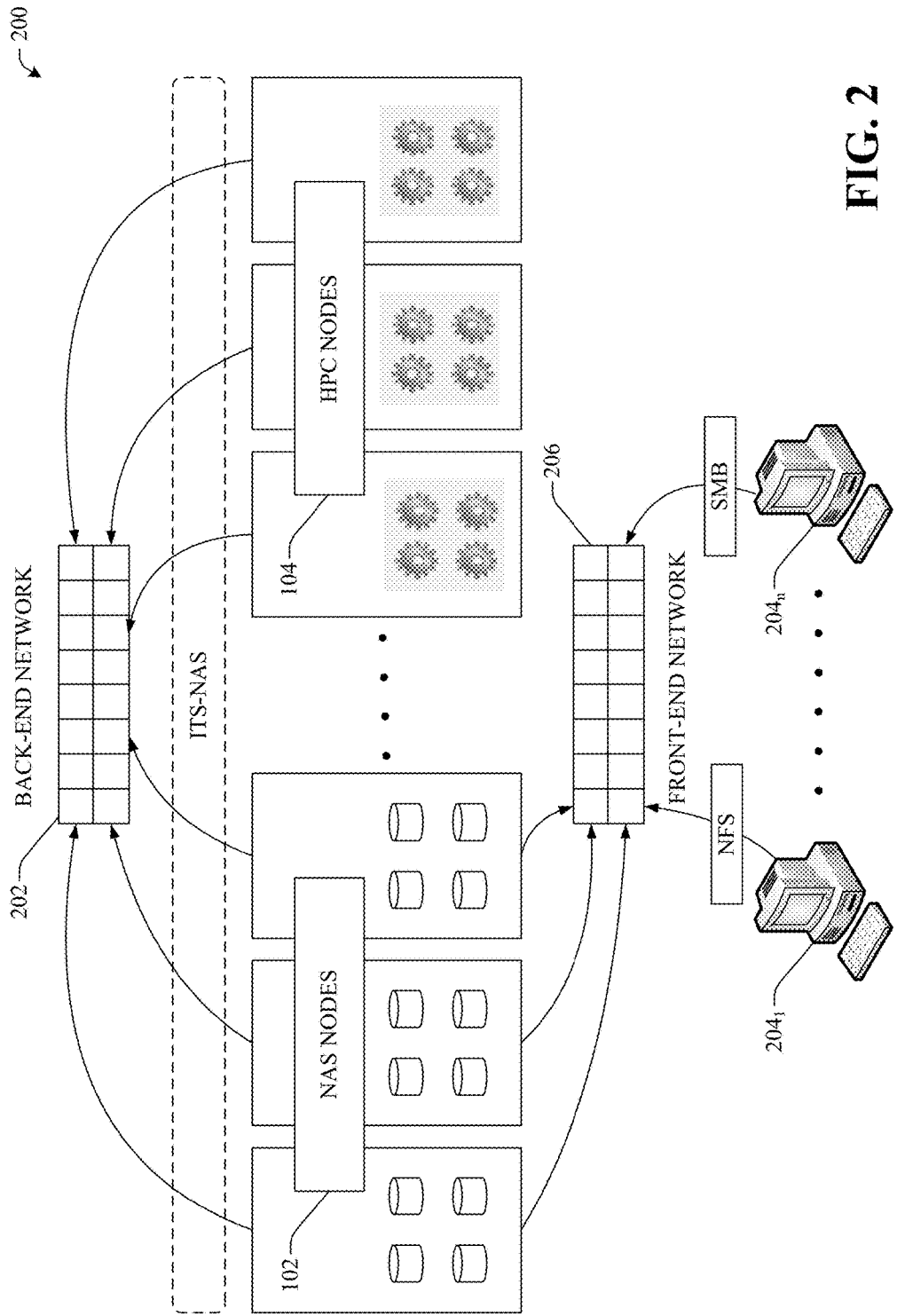
FIG. 2 illustrates an example ITS-NAS file system comprised of NAS nodes that are tightly coupled to HPC nodes via a common high-bandwidth, low-latency network infrastructure.

Referring now to FIG. 2, there is illustrated an example ITS-NAS file system 200 comprised of NAS nodes 102 that are tightly coupled to HPC nodes 104 via a common high-bandwidth, low-latency private network infrastructure, for example, back-end network 202. Moreover, the NAS nodes 102 and HPC nodes 104 are managed by a common operating system that allows for a fast mechanism for processing of Big Data. In one example, the NAS nodes 102 and HPC nodes 104 can utilize a high-bandwidth, low-latency protocol (e.g., IB protocol) for communications that are routed via a switch (e.g., IB switch) of the back-end network 202. It is noted that the NAS nodes 102 and the HPC nodes 104 can include functionality as more fully described herein, for example, as described above with regard to system 100. Further, its noted that the back-end network 202 is substantially similar to the low-latency, high-bandwidth private network infrastructure 106 described with respect to system 100 and can include functionality as more fully described herein, for example, as described above with regard to the low-latency, high-bandwidth private network infrastructure 106.

Conventional systems do not provide a fully integrated operating system that allows for easy grow-as-needed computation and storage. In contrast, system 200 provides an environment where computation and storage are seamlessly connected through high-speed communication channels (e.g., back-end network 202). In addition, conventional file systems are passive, for example, they do not drive any decision at the application level. Often, file systems can provide mechanisms that allow application developers to intercept file system I/O requests and transparently carry out low-level (e.g., non-HPC, that do not require significant computational speed and/or resources, etc.) operations on files, e.g., data compression, before forwarding the requests to the storage driver. However, such available mechanisms are limited to being executed within the context of the file systems themselves, i.e., they are not performed via HPC nodes. They do not have any knowledge about business rules at the application level, let alone the capacity to run HPC tasks. System 200 comprises an active file system that is aware of computing resources and business rules needed to carry out ITS applications. Moreover, active file systems can enable the creation of an easy-to-use environment where scale-out computation and scale-out storage are more efficiently implemented. In particular, the intelligence in ITS applications lies in the business rules that determine what actions are to be performed when files are received and/or are modified in the folders monitored by applications.

In one aspect, the NAS nodes 102 that are tightly connected to HPC nodes 104 via low-latency, high-bandwidth back-end network 202, are able to provide data to the HPC nodes 104 and facilitate execution of services on the HPC nodes 104. The HPC nodes 104 apply transformations on the data provided by the NAS nodes 102 and generate output results, which are written back to the NAS nodes 102, for example, at predefined locations (e.g., folders). End user devices and/or client applications ($204_1$-$204_n$; wherein "n" is most any natural number) interact with the NAS nodes 102 via a front-end network 206 by employing file transfer network communication protocols. For example, the end user devices and/or client applications ($204_1$-$204_n$) can transmit I/O requests to the NAS nodes 102 and receive the result of the I/O requests from the NAS nodes 102.

Figure 3:
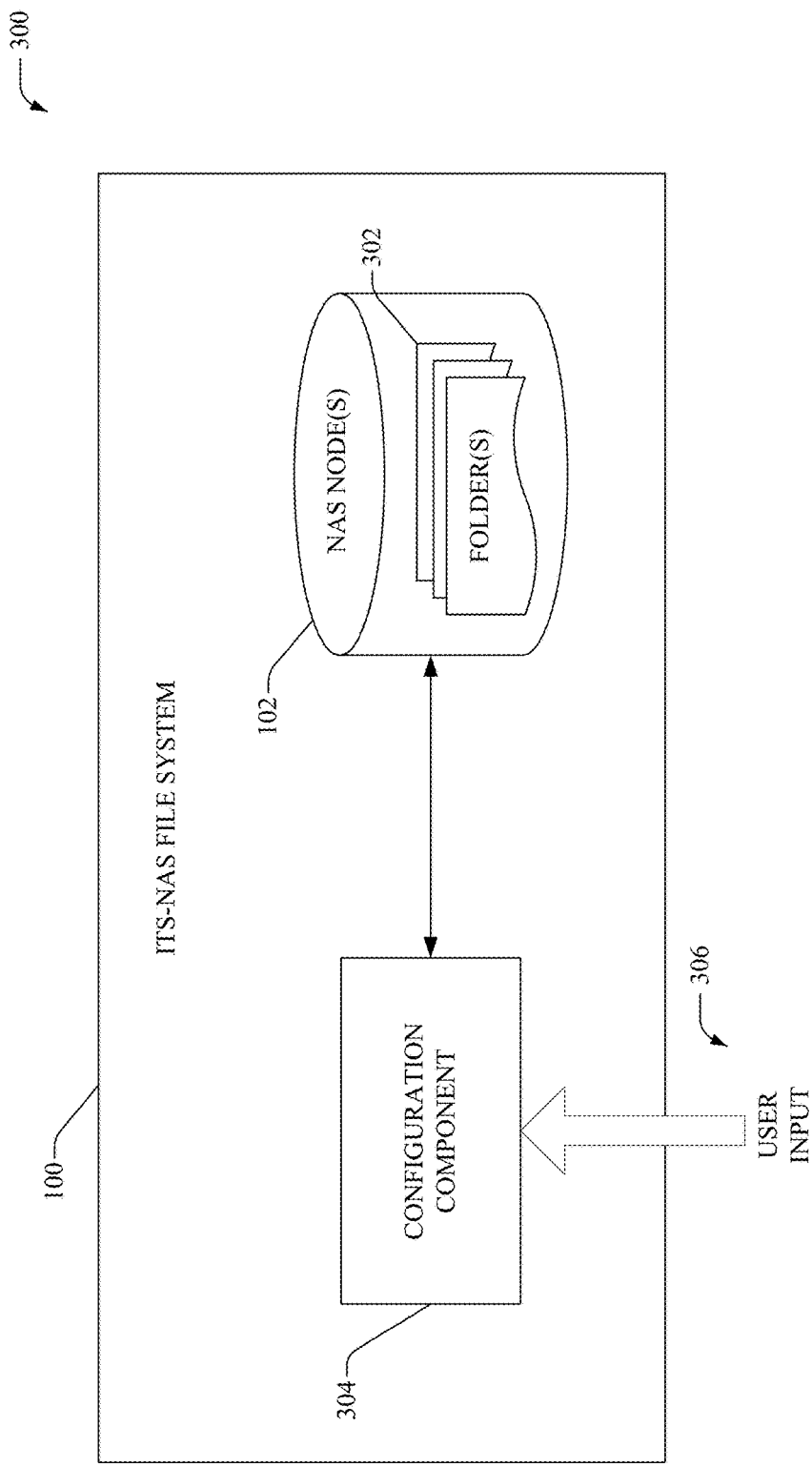
FIG. 3 illustrates an example system that facilitates configuration of intelligent folders within a scale-out distributed file storage system.

FIG. 3 illustrates an example system 300 that facilitates configuration of intelligent folders within a scale-out distributed file storage system, according to one or more aspects of the disclosed subject matter. In one aspect, the ITS-NAS file system 100 can be utilized for running transform services on designated folders (e.g., folders 302), which are referred to as "Hot Folders". Hot Folders are a central mechanism by which the ITS-NAS file system 100 intercepts user I/O, interprets these requests according to pre-established rules, and promptly carries out the instructions contained in those rules. It is noted that the ITS-NAS file system 100 and the NAS nodes 102 can include functionality as more fully described herein, for example, as described above with regard to systems 100-200.

According to an embodiment, a configuration component 304 can be utilized to create and/or edit "hot" folders (and/or files, directories, and/or any grouping of content), for example, based on user input 306. As an example, the user input 306 (e.g., received from a system administrator, manager and/or operator) can specify folders 302 that are to be marked as hot folders (and/or hot folders that are to be changed to regular non-hot folders) at most any time. The term "hot" folder as used herein relates to a folder (e.g., logical grouping of files) that comprises data (e.g., at least one file) that is to be processed (e.g., by a set of the HPC nodes) on receiving an I/O request directed to the folder. A set of rules for processing of the data can also be specified via the configuration component 304. In one aspect, the NAS nodes 102 can be tightly coupled to HPC nodes (e.g., HPC nodes 104) via a high-bandwidth and low-latency private network infrastructure.

Moreover, the NAS nodes 102 can present data to the HPC nodes as well as dispatch the execution of transform services to the HPC nodes for processing data within the hot folders. This approach allows for massive parallelization of operations on files, for example, complex distributed operations on large files or simple parallel operations on large collections of small files, all within the same hardware and software architecture.

Referring back to FIG. 3, the configuration component 304 can specify a set of rules by which the data will be processed by the file system 100. In one aspect, the configuration component 304 can select which folders 302 in the ITS-NAS file system 100 are "hot". Further, for each hot folder, the configuration component 304 can define a set of parameters, such as, but not limited to, the types of files to be processed, a service that is to be run in order to transform the files, and/or other related parameters. Rules can be conditioned on information about the computation and storage environment, for example, a current status (e.g., idle or busy) of the ITS-NAS file system 100, such that ITS services are run only if those conditions are met.

In one example, a graphical user interface (GUI) can be utilized for configuration of hot folders. In one aspect, the configuration component 304 can present the GUI to a user (e.g., network system administrator, manager and/or operator) to facilitate configuration of hot folders. Moreover, only authorized users (e.g., verified using credentials, biometric data, etc.) can be allowed to configure the hot folders. The GUI can include a plurality of related images and interface objects or elements to facilitate retrieval of conversion parameters and/or options. For example, GUI can include any combination of, among other things, text, text boxes, drop down menus, checkboxes, and buttons which can be interacted with utilizing one or more of a pointing device (e.g., stylus, mouse, trackball, touchpad . . . ), keyword, or voice activated software, of a user device.

Folders (or directories) can be organized based on various techniques and/or hierarchies, such as, but not limited to a folder tree. A regular (non-hot) folder, for example, folder 704, can be changed to (marked as) a hot folder and a set of parameters can be defined for the hot folder (e.g., via the configuration component 304). In one aspect, the parameters can include a selection parameter that selects files that will be processed in the folder, based on predicate formulas that utilize file metadata. In another aspect, data distribution parameters intrinsic to the file system can be specified. For example, a streaming option or batch option can be selected to specify whether the transform services (e.g., processing of the files) are to be run in a streaming or batch mode. Further, files can be selected based on file type, file extension, filenames, file size, creation date, last used date, last viewed date, etc. Most any criteria to select files within the hot folder can be utilized. For example, user input can specify that files of type ".mp3" and/or larger than 300 MB are to be selected for further processing. Additionally, a service (e.g., executable) that is to be applied to the selected files can be specified. For example, a service, "Transform_codec.exe" can be selected. Further, required computing infrastructure for processing the selected files can be specified. For example, a number of cores and memory for each core can be allocated. Furthermore, threshold parameters related to NAS and/or HPC resource utilization can be defined. As an example, the threshold parameters can be employed to determine whether further processing of files is allowed depending on available storage or computational resources.

In addition, for the cases wherein more than one core processor has been specified, a program that virtually and/or optimally "splits" the selected files into logical addresses, having prior knowledge about the file structure, can be selected via the configuration component 304. The splitter can return a list of addresses, relative to the starting address of the file, which can be used by the service that will operate on the correct chunks of the files. The configuration component 304 can also be utilized to select an output folder that stores the results of the processing. In one example, the results from the output folder can be provided to the user (e.g., on receiving a read request). Additionally or alternatively, the output folder can also be designated as a hot folder (e.g., nested hot folders) and the results can be further processed by the HPC nodes. In this example, the intermediate results may not be provided to the user and only a final result can be provided to the user. It is noted that the specification is not limited to the above listed parameters and a greater or fewer number or parameters can be configured and/or utilized during processing of data stored within the hot folders.

Differently from "watch folder" applications, wherein ITS services need to be embedded in user applications and deployed in all client computers, the Hot Folder mechanism only needs to be deployed in the ITS-NAS file system 300. One of the main advantages of this centralized approach is that application developers do not need to write additional code for polling content changes in folders exported via NFS, SMB, etc. Instead, they can simply register rules associated with hot folders to handle these changes accordingly. In one example, the rules can have knowledge about available system resources and can deny or allow the execution of the specified services based on such knowledge.

In one aspect, the user input data utilized for configuration of hot folders can be received from an interface within the file system itself (e.g. a node of NAS nodes 102) and/or received from an interface accessed externally (e.g. an HTTP web interface), for example via a front-end network. System 300 can provide various benefits to the end users, such as, but not limited to: (i) Ease of use: file processing specifications are configured and/or implemented according to simple predicate rules handled by the file system; (ii) Ease of deployment: setup is performed on a single location by a file system administrator; and/or (iii) Easy access to fast computation: system 100 allows for massive parallelization of transform services.

Figure 4:
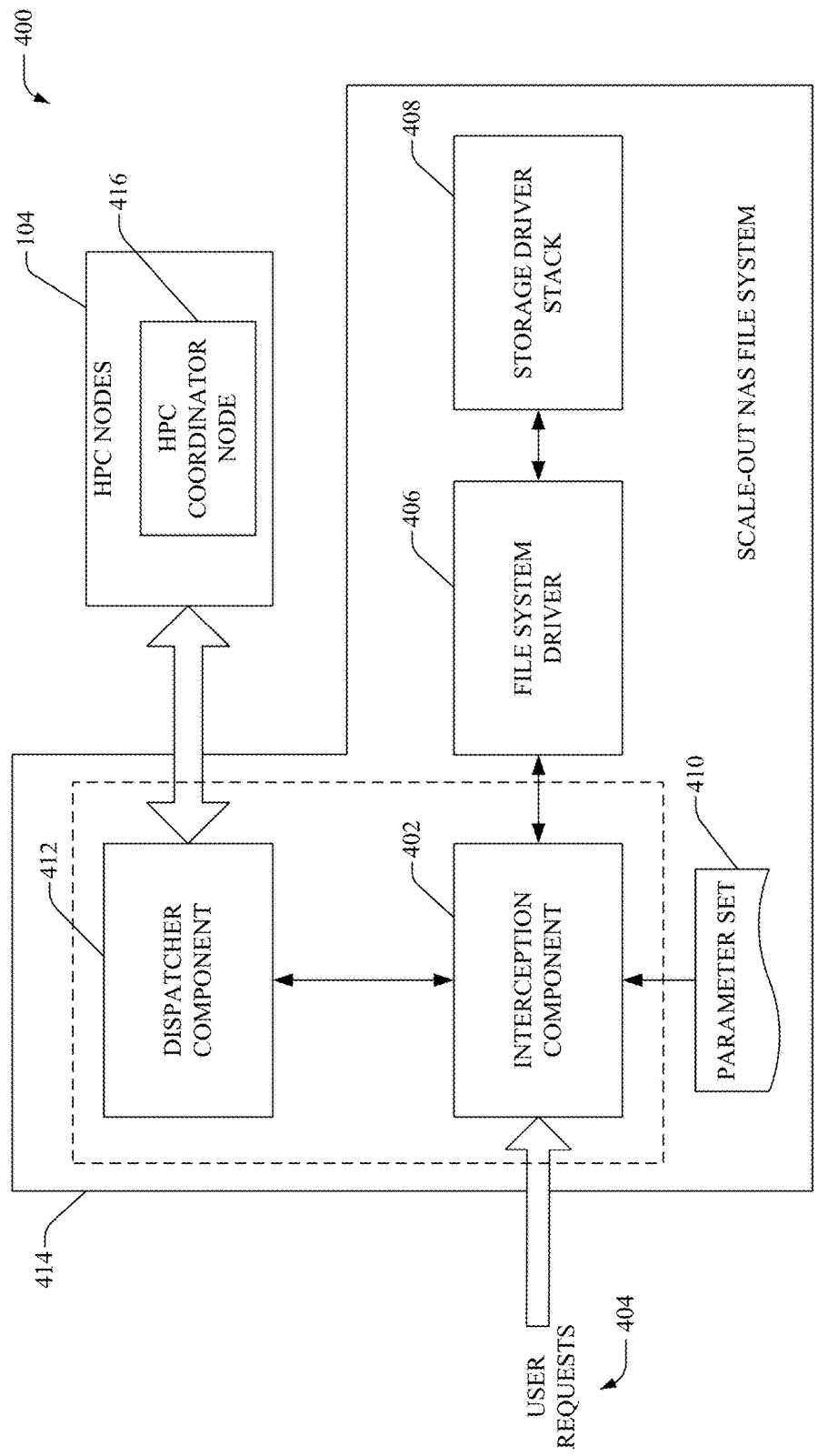
FIG. 4 illustrates an example system that facilitates predicate-based processing of data stored within the ITS-NAS file system.

Referring now to FIG. 4, there illustrated is an example system 400 that facilitates predicate-based processing of data stored within the ITS-NAS file system, according to an aspect of the subject disclosure. System 400 utilizes predicate-based interceptors to monitor the content in hot folders and perform an action upon the content.

According to an embodiment, an interception component 402 can be utilized to intercept user requests 404 (e.g., I/O requests) received from a client device before they are transferred to a file system driver 406 and/or storage driver stack 408 of a scale-out NAS file system 414 (e.g., implemented by NAS nodes 102). Typically, operating systems are built with a collection of pieces of software, called drivers, responsible for communicating with devices, such as storage, user input, and/or display. In one example, the interception component 402 can include a customized driver placed in the file server operating system stack on top of the file system driver 406, which is the top-level driver responsible for file I/O handling. The interception component 402 can receive the user requests 404, analyze the information in the requests, and take an appropriate action based on the analysis. As an example, the action can include, but is not limited to, (i) passing along the unaltered request to the file system driver 406; (ii) discarding, ignoring, or blocking the request; and/or (iii) transforming the request before forwarding it to the file system driver 406.

The interception component 402 can instantiate a predicate-based interceptor at most any time, for example, when a hot folder has been created (e.g., using the configuration component 304). Each instantiated interceptor is associated with a single hot folder; however, a single hot folder can be related to multiple interceptors. The interceptors can evaluate the specified predicate (e.g., defined via the configuration component 304) against an intercepted user request 404 and forward the parameters 410 (e.g., defined via the configuration component 304) that define the hot folder to a dispatcher component 412. In one aspect, the dispatcher component 412 can comprise a driver that is called when the predicate is evaluated (e.g., by the interception component 402) to be true, including the conditions related to the computation and storage environment. Moreover, the dispatcher component 412 effectively communicates with the HPC nodes 104 to initiate processing of selected files of the hot folder. Although only one dispatcher component 412 is depicted in FIG. 4, it is noted that the subject specification is not limited to a single dispatcher component 412. For example, if multiple dispatcher components are activated within the infrastructure, the dispatcher component responsible for handling the intercepted file I/O request can be specified by the configuration component 304 during creation/configuration of the hot folder. In addition, although the interception component 402 and the dispatcher component 412 are depicted are separate components, it is noted that the subject specification is not limited to separate components and that functionality of the interception component 402 and the dispatcher component 412 can be performed by a monolithic component operating in the user or kernel mode. According to an aspect, the dispatcher component 412 can comprise a queue of parameter sets, each set corresponding to rules applied to a hot folder, in order to manage service execution.

In an aspect, the interception component 402 can monitor user requests 404 received by the infrastructure to access the file system 414. If determined that a received user request 404 is directed to a regular, non-hot, folder, the interception component 402 can forward the unaltered request to the file system driver 406. If determined that a received user request 404 is directed to a hot folder, the interception component 402 identifies a parameter set 410 associated with the hot folder and evaluates the criteria (e.g., predicate) associated with the hot folder. If determined that the criteria is not met, the interception component 402 can perform a default action to handle the request, such as, but not limited to, ignore the request, provide an error message to the user, transfer the unaltered request to the file system driver 406, etc. Alternatively, if determined that the criteria has been met, the interception component 402 can call the dispatcher component 412 and transfer the request and a parameter set 410 associated with the hot folder to the dispatcher component 412. The dispatcher component can receive the parameter set 410 and place the parameter set 410 in its parameter set queue.

In one example, the interception component 402 can operate in a kernel-mode while the dispatcher component 412 can operate in a user-mode software layer that is responsible for starting all processes in the HPC nodes 104, for example, by sending requests to a HPC coordinator node 416 of the HPC nodes 104. According to an aspect, the HPC coordinator node 416 can assign workloads between all HPC nodes 104. Further, the HPC coordinator node 416 can track the amount of resources that are allocated at each of the HPC nodes 104 and can detect failed nodes, among other tasks. In one example, the HPC coordinator node 416 can be a dynamic role that can be assumed by different node of the HPC nodes 104 at different times. This can guarantee that there is no single point-of-failure in the computing phase. Furthermore, based on the instructions from the dispatcher component 412, the HPC coordinator node 416 can assign, to the HPC nodes 104, tasks related to processing and/or transformation of the data stored in selected files of the hot folder. The HPC nodes 104 can perform the processing and/or transformation, for example, asynchronously, and return the results as specified by the parameter set 410. For example, the results can be stored within a folder specified in the "output" section of the parameter set 410, for example, through the back-end communication channel between the NAS file system 414 and the HPC nodes 104. As an example, the results can be a single file, a set of files, or even no file at all.

As an example, the dispatcher component 412 can perform acts, such as represented by the following pseudocode:

```
Do while Dispatcher is loaded on the Operating System:
    PS=PS_queue.dequeue( ); // Dispatcher gets a Parameter Set from queue
    If (splitter !=null) // there is a splitter file
        List_file_offsets=PS.Splitter.split(PS.NumCores)
        //runs splitter on file
    Else
        List_file_offsets=null
    HPC_Coordinator.Run(PS.Service,    PS.NumCores,
        PS.RAM, List_file_offset)
End // Infinite loop
```

It is noted that the above provides example operations and that the subject disclosure is not limited to the above example operations for management of the list of transform services that are to be executed by the dispatcher component 412. In one aspect, an asynchronous model can be employed wherein the dispatcher component 412 can abide to a "fire-and-forget" principle. For example, once the dispatcher component 412 transmits the requests for processing to the HPC coordinator node 416, the dispatcher component 412 does not wait for any response from the HPC nodes 104.

In one aspect, the NAS nodes 102 can comprise and/or implement the interception component 402 that can intercept file I/O requests and decide whether the I/O requests need to be processed, based on the predicates evaluated against file metadata. The NAS nodes 102 can also comprise and/or implement the dispatcher component 312 that can delegate, to a HPC coordinator node 416, the execution of the transform services with the specified resources. It is noted that the processing of file data is not only be carried out when hot folder contents are modified (e.g., when a write request is received), but can also be initiated and performed when a read request is received from a client. For example, as soon as a read request is issued, a transform service can dynamically generate an updated file that is to be returned to the client by the ITS-NAS system.

Figure 5:
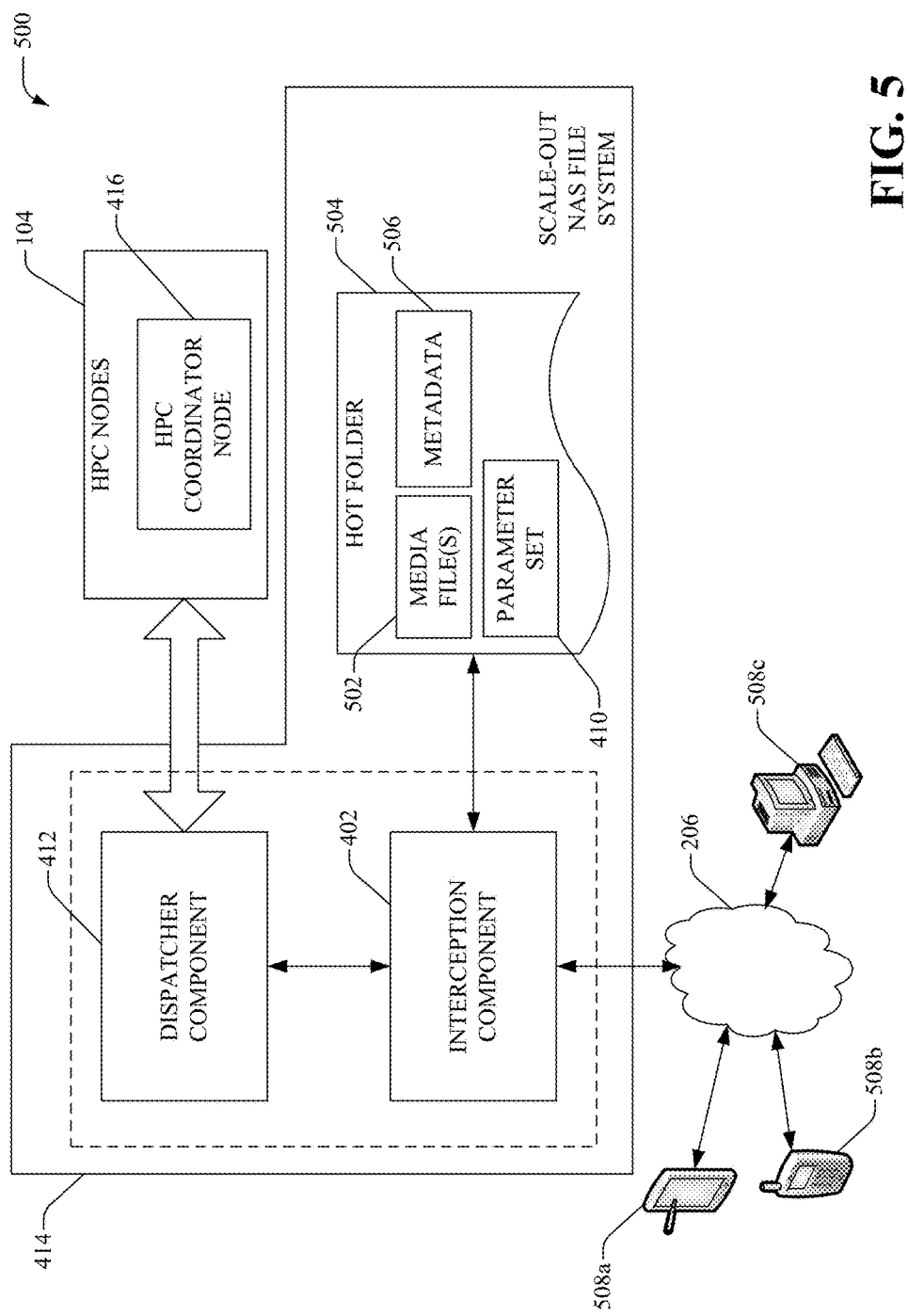
FIG. 5 illustrates an example system utilized for media transcoding, according to an aspect of the subject disclosure.

Referring now to FIG. 5, there illustrated is an example system 500 utilized for media transcoding, according to an aspect of the subject disclosure. It is noted that the HPC nodes 104, front-end network 206, interception component 402, dispatcher component 412, scale-out NAS file system 414, HPC coordinator node 416, can include functionality as more fully described herein, for example, as described above with regard to system 100-400. System 500 can be utilized in an example scenario of video transcoding. The increasing availability of video content on the Internet, allied to advances in network and mobile technology seen in the last decade, poses great challenges to the Media and Entertainment (M&E) Industry. As opposed to the recent past, where content was available in standard TV format, users today expect videos to be available on different devices, such as, but not limited to, mobile phones, tablet computers, wearable devices, video game consoles, computers and, in addition, in different resolutions to facilitate streaming and/or downloading. Thus, for each newly produced media file, a content distributor needs to make the content available in a plethora of different output formats (e.g., encoding types). To cope with this demand, M&E companies can utilize system 500 to facilitate file transcoding processes of their media files 502.

In one aspect, the folder that stores the media files 502 can be converted to a hot folder 504 (e.g., by employing configuration component 304). Further, a parameter set 410 can be configured for the hot folder 504 (e.g., by employing configuration component 304). In one example, the hot folder 504 can also comprise metadata 506 related to the media files 502, such as, but not limited to, file size, creating and/or modification date, media type, description of the media, etc. For example, a system administrator can create the hot folder 504 and set associated rules (e.g. parameter set 410) for the transformation. For example, the system administrator can: (i) choose a folder of the storage to become hot; (ii) indicate which splitter service (if any) will be used for virtually splitting the input files in a optimal way for the parallel processing; (iii) indicate which service will process the selected files, e.g., the transcoding service; (iv) determine the required infrastructure to run the service, e.g., the number of CPUs and/or the total memory to be utilized on each HPC node; and/or (v) choose a folder of the storage to store the output of transcoding executions. Once the rule is set up, every operation on the specified hot folder is intercepted by the interception component 402. The dispatcher component 412, in turn, can communicate with integrated HPC Coordinator node 416 to launch the parallel transcoding service on top of the required infrastructure. The output of the transcoding service would then be stored on the output folder associated with the hot folder rule. Additionally or alternatively, the output of the transcoding service can also be provided to the user device 508a-508c. In this example scenario, the HPC nodes 104 can perform massively parallel media transcoding to transform the input file types or formats into the required output file types or formats that are suitable for user devices. Although only three user devices are illustrated in FIG. 5, it is noted that the subject specification is not limited to three user devices and a greater or fewer number of user devices can access the scale-out NAS file system 414.

Figure 6:
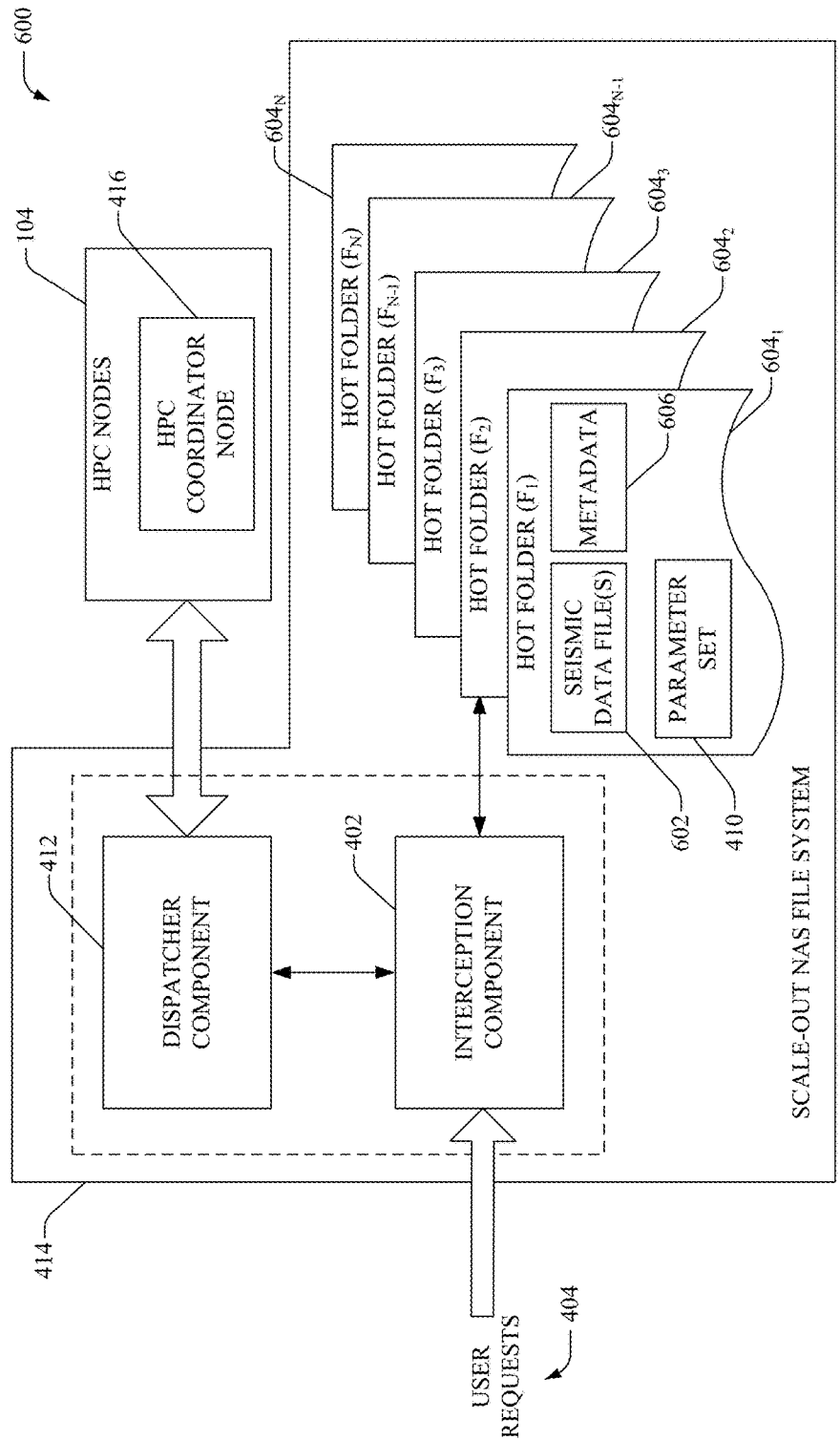
FIG. 6 illustrates an example system utilized for seismic processing applications, according to an aspect of the subject disclosure.

FIG. 6, there illustrated is an example system 600 utilized for seismic processing applications, according to an aspect of the subject disclosure. It is noted that the HPC nodes 104, user requests 404, interception component 402, parameter set 410, dispatcher component 412, scale-out NAS file system 414, HPC coordinator node 416, can include functionality as more fully described herein, for example, as described above with regard to system 100-500. Seismic interpretation is the process through which geophysicists search for potential areas of oil exploitation based on images derived from data acquisitions on and/or offshore. Seismic processing workflows encompass the operations that are necessary to convert raw data obtained in seismic acquisitions into the images that will be analyzed later. Seismic data typically come in the form of large standardized files, and seismic processes heavily depend on HPC in order to process these files in reasonable time.

In one aspect, the folder that stores the seismic data files 602 can be converted to a hot folder $604_1$ (e.g., by employing configuration component 304). Further, a parameter set 410 can be configured for the hot folder $604_1$ (e.g., by employing configuration component 304). In one example, the hot folder $604_1$ can also comprise metadata 606 related to the seismic files 602, such as, but not limited to, file size, creating and/or modification date, file type, description of the data, timestamps, etc. Oftentimes, a typical seismic processing workflow involve several operations, each of which receiving as input the output (e.g., file) resulting from the previous operation. In this example scenario, a system administrator can configure a set of rules (e.g., parameter set 410) in a "daisy-chain" fashion, which would represent the sequence of processing operations, as exemplified below:

RULE 1: (i) choose folder $F_1$ $604_1$ to become hot; (ii) indicate a first splitter service (if any) that will be used in $F_1$ $604_1$ to optimally split the files; (iii) indicate a first service (e.g., operation of the seismic processing workflow) to process files in $F_1$ $604_1$; (iv) determine the required infrastructure to run the first service; and/or (v) choose a folder $F_2$ $604_2$ as the output folder.

RULE 2: (i) choose folder $F_2$ $604_2$ (output folder of RULE 1) to become hot; (ii) indicate a second splitter service (if any) that will be used in $F_2$ $604_2$ to optimally split the files; (iii) indicate a second seismic processing service to process files in $F_2$ $604_2$; (iv) determine the infrastructure to run the second service; and/or (v) choose folder $F_3$ $604_3$ as the output folder.

RULE N (wherein, N is most any natural number greater than 1): (i) choose folder $F_{N-1}$ $604_{N-1}$ (output of RULE N−1) to become hot; (ii) indicate the $N^{th}$ splitter service (if any) that will be used in $F_{N-1}$ $604_{N-1}$ to optimally split the files; (iii) indicate the $N^{th}$ seismic processing service to process files in $F_{N-1}$ $604_{N-1}$; (iv) determine the infrastructure to run the $N^{th}$ service; (v) choose folder $F_N$ $604_N$ as the output folder. In one example, for a read request, only the output data from folder $F_N$ $604_N$ can be provided to the user.

Figure 7:
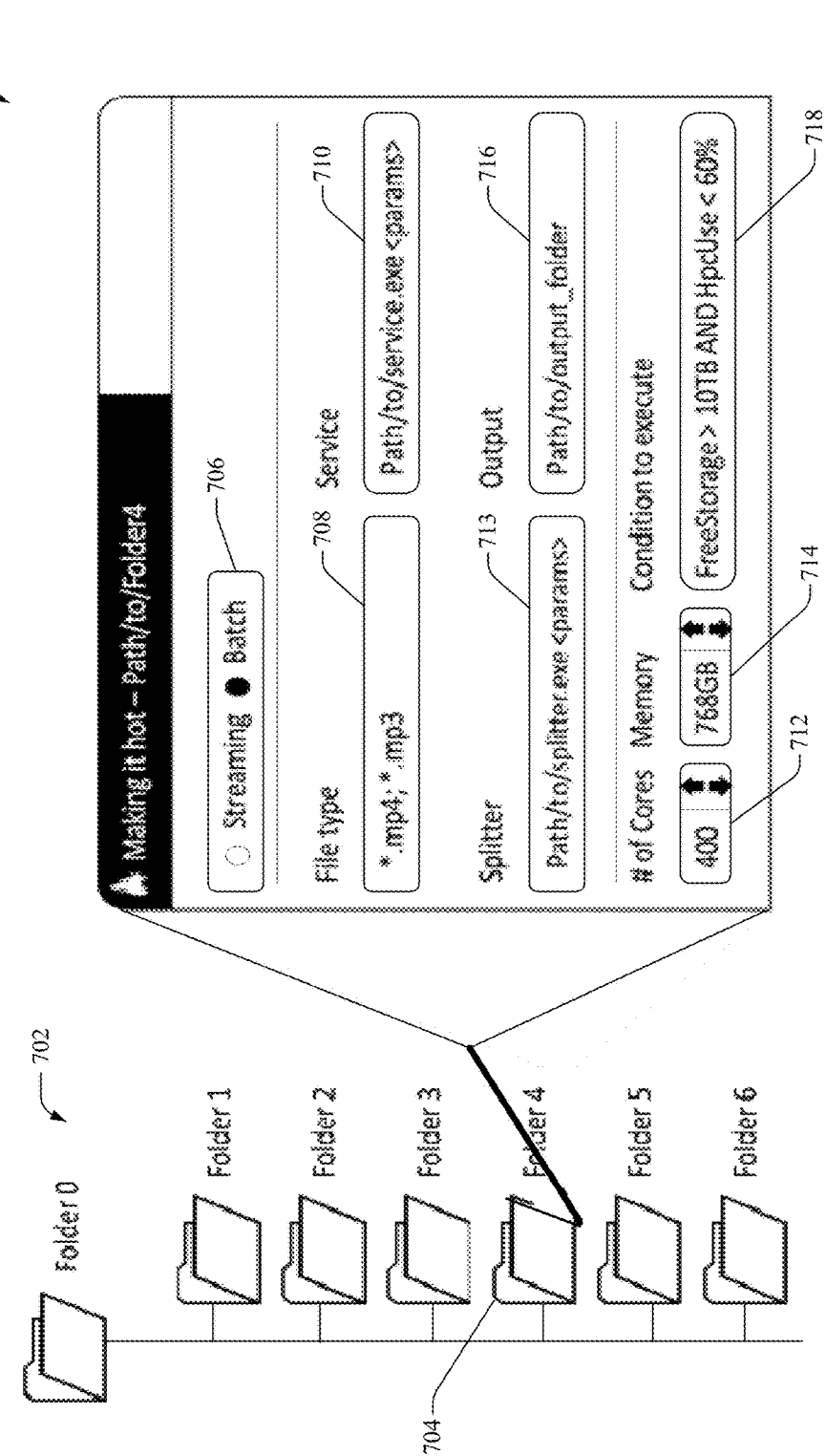
FIG. 7 illustrates an example graphical user interface (GUI) for configuration of hot folders.

Referring now to FIG. 7, there illustrated is an example graphical user interface (GUI) 700 for configuration of hot folders, in accordance with an aspect of the subject disclosure. In one aspect, the configuration component 304 (FIG. 3) can present GUI 700 to a user to facilitate configuration of hot folders. Moreover, only authorized users (e.g., verified using credentials, biometric data, etc.) can be allowed to configure the hot folders. According to aspect of the subject invention, a wizard can be employed by or embody the configuration component 304 (FIG. 3) to facilitate creation and/or management of hot folders. As an example, wizard is a user interface (e.g., GUI) that guides a user through a sequence of steps, wherein each step can be completed before advancing to the next step in the series unless the step is optional, of course. GUI 700 includes a plurality of related images and interface objects or elements to facilitate retrieval of conversion parameters and/or options. For example, GUI 700 can include any combination of, among other things, text, text boxes, drop down menus, checkboxes, and buttons which can be interacted with utilizing one or more of a pointing device (e.g., stylus, mouse, trackball, touchpad . . . ), keyword, or voice activated software, of a user device. It should be noted, however, that these illustrations are provided by way of example and not limitation. As one of skill in the art can appreciate, there is a plethora of ways to arrange and present objects and text of graphical user interfaces. The depicted GUI 700 illustrates only one such arrangement and are presented for purposes of clarity and understanding and not to limit the scope of the subject invention to that which is disclosed.

Folders (or directories) can be organized based on various techniques, such as, but not limited to a folder tree. A regular (non-hot) folder, for example, folder 704, can be changed to (marked as) a hot folder and a set of parameters can be defined for the hot folder (e.g., via the configuration component 304). In one aspect, the parameters can include a selection parameter that selects files that will be processed in the folder 704, based on predicate formulas that utilize file metadata. In another aspect, data distribution parameters intrinsic to the file system can be specified. For example, at 706, a streaming option or batch option can be selected to specify whether the transform services (e.g., processing of the files) are to be run in a streaming or batch mode.

In one example, files can be selected based on file type (708), file extension, filenames, file size, creation date, last used date, last viewed date, etc. Most any criteria to select files within the hot folder 704 can be utilized. For example, user input can specify that files of type .mp3 and/or larger than 300 MB selected for further processing. At 710, a service (e.g., executable) that is to be applied to the selected files can be specified. For example, a service, "Transform_codec.exe", can be selected. Further, required computing infrastructure for processing the selected files can be specified. For instance, number of cores 712 and memory 714 for each core can be allocated. Furthermore, at 718, threshold parameters related to NAS or HPC resource utilization; for example, to allow further processing of files depending on available storage or computational resources can also be specified.

In addition, for the cases wherein more than one core processor has been specified, a program that virtually and/or optimally "splits" the selected files into logical addresses, having prior knowledge about the file structure, can be selected at 713. The splitter can return a list of addresses, relative to the starting address of the file, which can be used by the service that will operate on the correct chunks of the files. At 716, an output folder can be specified to store the results of the processing. In one example, the output folder can also be a hot folder (e.g., nested hot folders) and the results can be further processed. In this example, the intermediate results may not be provided to the user and only a final result can be provided to the user. It is noted that the specification is not limited to the above listed parameters and a greater or fewer number or parameters can be configured and utilized during processing of data stored within the hot folders.

Figure 8:
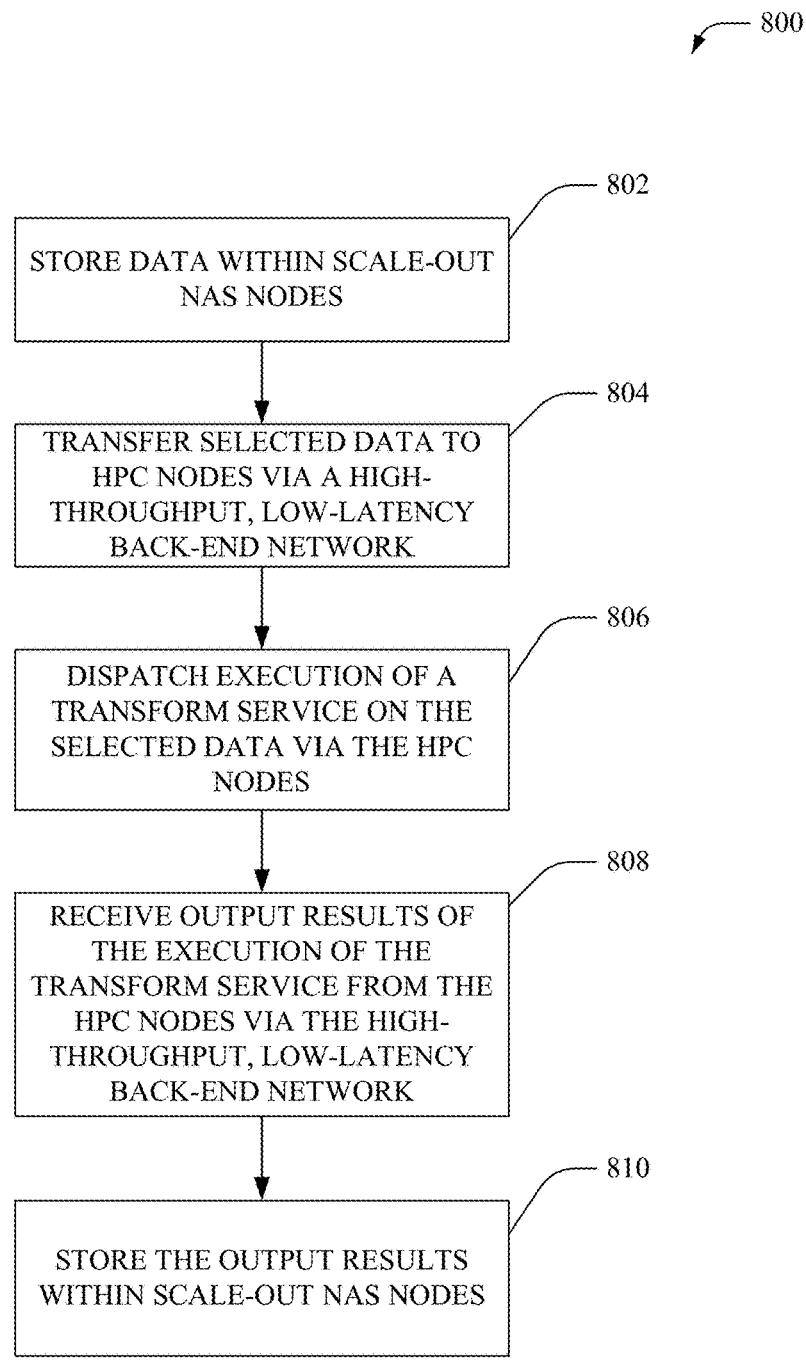
FIG. 8 illustrates an example method that facilitates integration of scale-out NAS nodes and HPC nodes.
Figure 9:
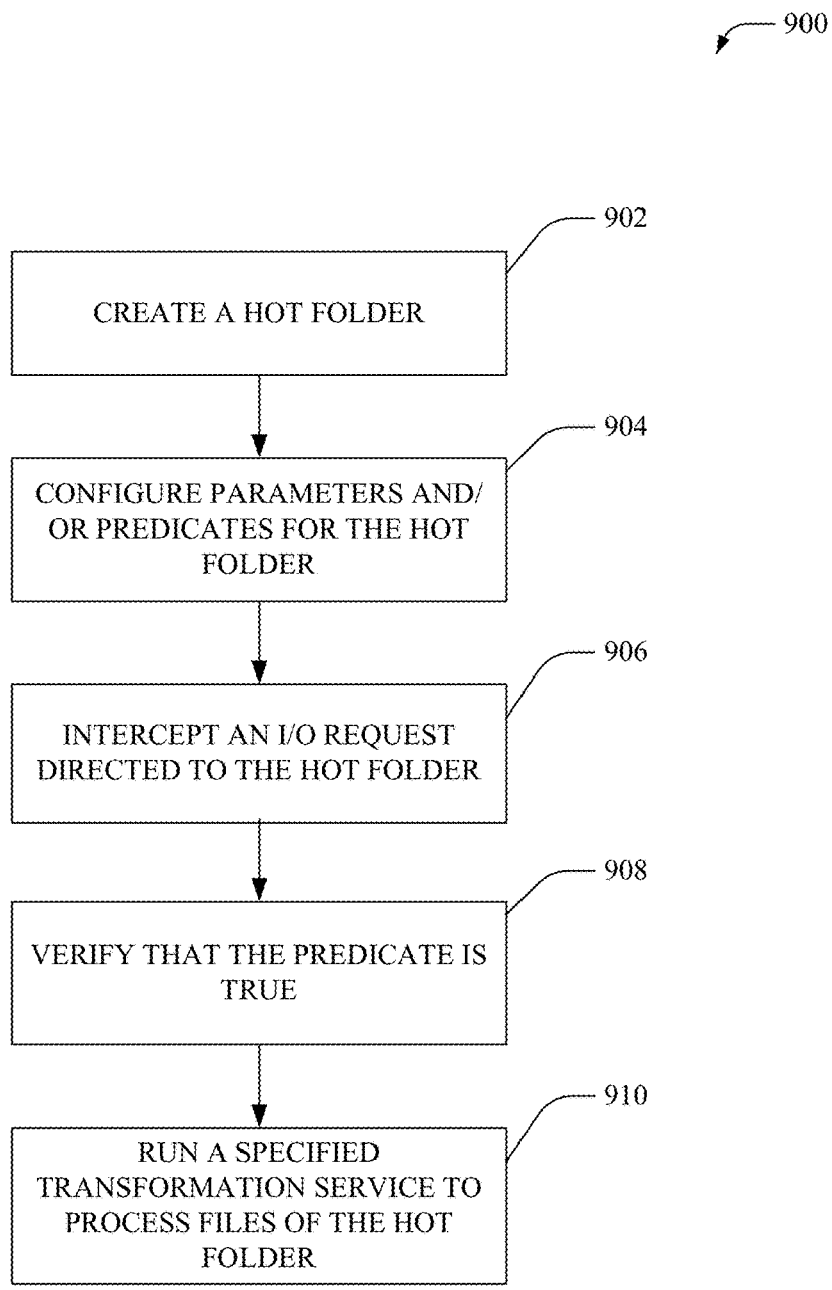
FIG. 9 illustrates an example method that facilitates HPC on data stored within a scale-out NAS file server.

FIGS. 8-9 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 8, there illustrated is an example method 800 that facilitates integration of scale-out NAS nodes and HPC nodes, according to an aspect of the subject disclosure. Moreover, the scale-out NAS nodes and HPC nodes can be managed via a unified operating system. The unified operating system running on both devices, e.g., NAS nodes and HPC nodes, allows for the data processing to be fast and scalable. Moreover, to be fast and scalable, the data workloads are processed asynchronously by the HPC nodes. At 802, data can be stored within the scale-out NAS nodes. Typically, large volumes of data, for example, Big Data, is stored within the scale-out NAS nodes. At 804, selected data can be transferred to the HPC nodes via a high-throughput and/or low-latency back-end network, for example, by employing an IB protocol. At 806, execution of transform service (e.g., a service that processes the selected data) on the selected data via the HPC nodes can be dispatched. For example, instruction to initiate the transform service can be transferred from the scale-out NAS nodes to a HPC coordinator node via the back-end network. Moreover, the HPC coordinator node can assign workloads to select HPC node(s) to execute the transform service quickly and efficiently (e.g., by employing parallel processing techniques). At 808, output results of the execution of the transform service can be received (e.g., by a NAS node) via the high-throughput and/or low-latency back-end network. Further, at 810, the output results can be stored within the scale-out NAS nodes.

FIG. 9 illustrates an example method 900 that facilitates HPC on data stored within a scale-out NAS file server, according to an aspect of the subject disclosure. According to an aspect, method 900 facilitates utilization of hot folders that detect changes on the content stored within the hot folders, analyze the content, perform computational operations on it, and output the results as files on other designated folders. At 902, a hot folder can be created. As an example, most any folder within the scale-out NAS file server can be marked as, and/or converted to, a hot folder based on user input received via a user interface. Further, at 904, parameters and/or predicates for the hot folder can be configured. In one aspect, the configuration can be based on the input provided by a user/client, operator, administrator, network manager, and/or the like. For example, the input can be provided via a GUI on a client device coupled to the scale-out NAS file server via a front-end communication network that employs file-sharing protocols, such as, but not limited to Network File System (NFS), Server Message Block (SMB), etc. The parameters can include, but are not limited to, criteria for selecting files within the folder that are to be processed/transformed, a transformation service that is to be executed, a splitter service that is to be executed, system status conditions, computing infrastructure (e.g., memory, cores, etc.) employable to run the transformation service, a designated output folder(s) to store the results of the processing/transformation, etc. It is noted that hot folders can be configured when a folder is created or at a later time. Further, the hot folders can be edited/deleted at most any time (via user input). In addition, hot folders can be converted back to regular (non-hot folders) at most any time, for example, on receiving user input or after a defined time period.

At 906, I/O requests directed to the hot folder can be intercepted. At 908, it can be verified that the predicate is true (e.g., the defined criteria has been satisfied). As an example, file metadata, system status data, status indicators, etc. can be utilized to verify the predicate. Further, at 910, the specified transformation service can be run to process selected files of the hot folder. In one example, the processing can be performed by HPC nodes that are coupled to, and operate under the same operating system as, the scale-out NAS file server. The result of the processing can be stored within a specified output folder (e.g., defined during configuration of the hot folder). In one example, the results can be transmitted to the client device. Alternatively, if determined that the predicate is not true, then a default action can be performed. For example, the I/O request can be blocked or ignored, or the I/O request can be forwarded to a file system driver without any modifications.

Figure 10:
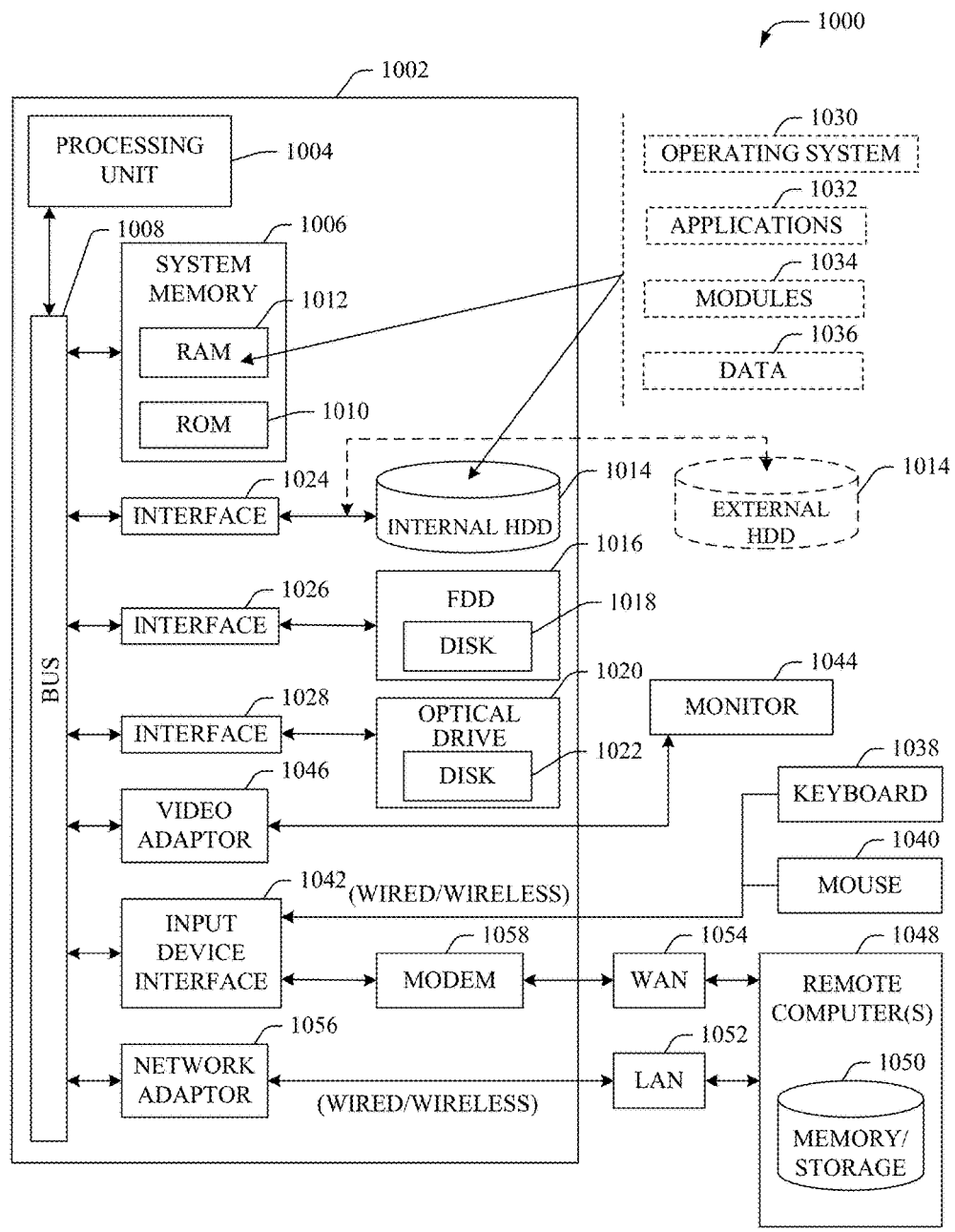
FIG. 10 illustrates a block diagram of an example computer operable to execute the disclosed file system architecture.

Referring now to FIG. 10, there is illustrated a block diagram of a computer 1002 operable to execute the disclosed file system architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), node(s), cluster(s), system(s), driver(s), and/or device(s) (e.g., ITS-NAS file system 100, NAS node(s) 102, HPC nodes 104, back-end network 202, end users and client applications (204₁-204ₙ), front-end network 206, configuration component 304, interception component 402, file system driver 406, storage driver stack 408, dispatcher component 412, scale-out NAS file system 414, HPC coordinator node 416, etc.) disclosed herein with respect to systems 100-400 can each include at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is noted that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It is noted that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A file system, comprising:
a processor; and
a memory that stores executable instructions that, when executed by the processor, facilitate performance of operations, comprising:
receiving, from a client device, request data that is related to accessing data that is stored within a network attached storage server device, wherein the network attached storage server device is part of a front-end of the file system;
in response to determining that the data is stored within a first folder of a plurality of folders, of the network attached storage server device, that has been assigned a group of rules that are employable to initiate a transform service that transforms at least a portion of the data, directing at least a portion of the data from the network attached storage server device to a high-performance computing server device of the file system via a private back-end network link, the high-performance computing server device being inaccessible to the client device, wherein the group of rules is related to an availability of system resources of the file system; and
instructing the high-performance computing server device to implement the transform service to generate transformed data that is to be transferred to the client device.

2. The file system of claim 1, wherein the operations further comprise:
receiving the transformed data from the high-performance computing server device via the private back-end network link.

3. The file system of claim 1, wherein the operations further comprise:
selecting at least the portion of the data based on configuration data received via a user device.

4. The file system of claim 3, wherein the high-performance computing server device has been assigned a coordinator role for a defined time period.

5. The file system of claim 1, wherein the directing comprises asynchronously directing at least the portion of the data to the high-performance computing server device.

6. The file system of claim 1, wherein the instructing comprises instructing the high-performance computing server device to process at least the portion of the data in response to determining that a resource utilization criterion associated with the file system has been satisfied.

7. The file system of claim 6, wherein the resource utilization criterion comprises a threshold associated with available computational resources associated with the high-performance computing server device.

8. The file system of claim 6, wherein the resource utilization criterion comprises a threshold associated with available storage resources associated with the network attached storage server device.

9. The file system of claim 1, wherein the file system comprises a single operating system instance that has a single workload queue.

10. The file system of claim 1, wherein the high-performance computing server device is a first high-performance computing server device of a group of high-performance computing server devices, and wherein the operations further comprise:
directing at least a second portion of the data from the network attached storage server device to a second high-performance computing server device of the group of high-performance computing server devices of the file system via the private back-end network link, the second high-performance computing server device being inaccessible to the client device.

11. A method, comprising:
receiving, by a network attached storage server device comprising a processor, request data from a client device via a front-end network, wherein the request data represents a request for content stored within the network attached storage server device; and
in response to determining the content is stored within a first folder of a plurality of folders, of the network attached storage server device, that has been assigned rules to process the content, communicating, by the network attached storage server device, with a high-performance computing server device via a backplane link of a private communication network, the high-performance computing server device being inaccessible to the client device, wherein the rules are related to an availability of system resources of the file system, and wherein the communicating comprises instructing the high-performance computing server device to implement a service that transforms at least a portion of the data to generate result data that is to be provided to the client device.

12. The method of claim 11, wherein the communicating comprises directing at least a portion of the content to the high-performance computing server device.

13. The method of claim 12, wherein the communicating comprises communicating via an InfiniBand link.

14. The method of claim 13, further comprising:
receiving, by the network attached storage server device, the result data from the high-performance computing server device via the backplane link.

15. The method of claim 14, further comprising:
storing, by the network attached storage server device, the result data within a defined output folder of the plurality of folders of the network attached storage server device, wherein the output folder is specified within the rules.

16. The method of claim 12, further comprising:
based on defined configuration data, selecting, by the network attached storage server device, at least the portion of the content.

17. The method of claim 12, wherein the instructing comprises instructing the high-performance computing server device to implement a transcoding service that modifies a format of at least the portion of the content.

18. A non-transitory computer-readable storage medium comprising instructions that, in response to execution, cause a high-performance computing server device comprising a processor to perform operations, comprising:
receiving content from a network attached storage server device via a back-end network link of a private communication network that couples the high-performance computing server device with the network attached storage server device, wherein the network attached storage server device is deployed in a front-end of a file system and the high-performance computing server device is deployed in a back-end of the file system, wherein the instruction data is received in response to determining that a request for accessing the content has been received from a client device and that the content is stored within a first folder of a plurality of folders of the network attached storage server device that has been assigned a set of rules that are that are employable to initiate a transform service that transforms the content, wherein the set of rules is related to an availability of system resources of the file system, and wherein the high-performance computing server device is inaccessible to the client device; and in response to receiving instruction data to initiate the transform service, facilitating a transformation of the content to generate result data that is to be transferred to the client device.

19. The non-transitory computer-readable storage medium of claim 18, wherein the operations further comprise:

facilitating a transmission of the result data to the network attached storage server device via the back-end network link.

20. The non-transitory computer-readable storage medium of claim 18, wherein the back-end network link comprises a backplane bus.

\* \* \* \* \*